Feb. 2, 1971 H. W. NEUHAUS 3,559,284

METHOD OF MANUFACTURING MAGNETIC STORE ARRANGEMENTS

Original Filed Dec. 16, 1965 2 Sheets-Sheet 1

INVENTOR.
HANS W. NEUHAUS
BY
Frank R. Trifari
AGENT

Feb. 2, 1971 H. W. NEUHAUS 3,559,284

METHOD OF MANUFACTURING MAGNETIC STORE ARRANGEMENTS

Original Filed Dec. 16, 1965 2 Sheets-Sheet 2

INVENTOR.
HANS W. NEUHAUS
BY
Frank R. Trifari
AGENT

United States Patent Office 3,559,284

Patented Feb. 2, 1971

3,559,284

METHOD OF MANUFACTURING MAGNETIC STORE ARRANGEMENTS

Hans Wilhelm Neuhaus, Hamburg, Germany, assignor to U.S. Philips Corporation, New York, N.Y.

Continuation of application Ser. No. 514,225, Dec. 16, 1965. This application Mar. 7, 1969, Ser. No. 806,050
Claims priority, application Germany, Dec. 17, 1964, P 35,709
Int. Cl. H01f 7/06
U.S. Cl. 29—604 10 Claims

ABSTRACT OF THE DISCLOSURE

An improved method of fabricating a magnetic storage array comprises the steps of forming a plate of synthetic material having grooves in at least one surface, spraying a molten ferrite material into the grooves so as to cover the entire surface of the grooves, placing a prefabricated cable of matrix wires in the grooves, filling the spaces between the cable and groove walls with a temperature-resistant lacquer to produce a flat surface within the grooves, and spraying a molten ferrite material over the lacquer surface to produce a covering ferrite layer that extends up to, and in contact with, the walls of the grooves, thereby producing a substantially closed magnetic path about the cable. The ferrite wall layers, or the ferrite covering layer, or both, are composed of a material having a square loop hysteresis property.

This application is a streamline continuation of application Ser. No. 514,225, filed Dec. 16, 1965, and now abandoned.

This invention relates to new and improved matrix arrangements for the magnetic storage of information, for example, in electronic computer installations, and to a new and improved method for fabricating such a storage matrix.

Known storage arrangements utilize, for example, annular magnetic cores having a rectangular hysteresis loop. The information is stored as an "0" or a 1, dependent upon whether the core is magnetized in the clockwise or counter-clockwise direction, that is to say whether the core is in the positive or the negative state of remanence. These cores are arranged in rows and columns and are formed into a magnetic core matrix by passing wires through them. In conventional arrangements, 4 wires extend through each core, i.e., in the X, in the Y and in the diagonal directions of the matrix. However, it is very laborious and time consuming to pass the wires through the cores to form a matrix. The cost of such a matrix is correspondingly high. Furthermore, the loss resulting from damage to the annular cores in passing the wires through them is comparatively high. If it is desired to obtain ultra-high speed stores, the individual cores must be made correspondingly small in size so that the assembly thereof is impeded still further. The possibility of increasing the switching current, a step which also speeds up the switching of the core, is limited by the low power of control electronics and the mains-interference signal ratio.

A known form of matrix comprises a ferrite plate having holes therein in which the ferrite plate material has a rectangular hysteresis loop. A ferrite plate made by the conventional method of molding and sintering has holes formed in it through which the necessary current conductors must be passed. This matrix arrangement is considerably more robust compared to the conventional wiring process and also permits at least part of the wiring to be printed phototechnically. The holes may be smaller, thus reducing the switching current required for the magnetic switching of the area surrounding the holes. To obtain unambiguous output voltages, the holes must be formed very accurately, which requires an expensive molding tool. A method which contemplates sintering ferrite beads on the crossings of a wiring system is therefore not practical, since the insulation of the current conductors deteriorates at the sintering temperature of 1300° C. Efforts have been made to avoid the post-sintering operation by spraying a ferrite layer in the molten state onto the crossings of the wiring system, or by applying such a layer from the gaseous state by evaporation. However, the method has hitherto not been used commercially.

Further methods which seem suitable for mass production are those of the so-called "laminated-ferrite" store and of the "flute" store. The "laminated-ferrite" store is composed of individual layers formed from a viscous ferrite paste on a glass substrate. In the ferrite paste there is a pattern of parallel lines consisting of powdered metal. When two such disks are placed one on the other so that the gratings intersect at right angles, with a ferrite disk interposed between them for insulation, the disks may be compressed and sintered together to form a matrix plane. In the "flute" store, the two wire systems which intersect at right angles are also relatively insulated electrically by means of a ferrite layer. In one embodiment, a ferrite cylinder is pressed around a system of conductors having a thermoplastic envelope. The second system of conductors rectangularly passes through said ferrite cylinder. During the sintering process the thermoplastic insulation flows off, thus providing space for any contraction that may occur during sintering. Both methods only permit a word address form of organization of the memory system. Consequently, the control electronics required for a comparatively large memory array becomes voluminous and expensive.

Another form of known matrix is the wafer-iron store. In this device, a ferrite plate, manufactured by the usual moulding and sintering method, has a grating milled in it corresponding to the wiring in a ferrite core memory. The relatively insulated current conductors are laid in these grooves. The polished surface of this ferrite body is covered by a thin layer of magnetic rectangular loop material. The air gap between the ferrite body and said layer must be very small. The information is stored in the magnetic layer and the ferrite body must provide a low reluctance to the magnetic flux. This method is still in its experimental stage. An important disadvantage thereof is that the surfaces must be manufactured with high accuracy and that an air gap cannot be completely avoided.

The invention relates to a method of manufacturing a magnetic store matrix in which the disadvantages and the manufacturing difficulties of the aforementioned arrangements and methods are avoided. By means of the novel method herein, high capacity matrices, which require relatively small switching currents, can be produced economically. The new method is characterized in that a grooved grating is produced, preferably in synthetic material, onto which a magnetic layer, preferably a ferrite layer, is sprayed in the molten state, or evaporation-deposited, so that the surfaces of the grooves are entirely covered by a solidified magnetic layer. Thereafter, a prefabricated gauze of matrix conductors is placed in the grooves and the interspaces are filled with a suitable filler so as to obtain a flat surface in the grooves onto which a ferrite layer is again sprayed in the molten state, or evaporation-deposited, until this surface is covered with a magnetic layer up to the edges of the grooves.

In this method it is not necessary for the gauze of matrix conductors to be heated to high temperatures. As a result, the insulation of the wires or even the wires themselves, are not damaged. Furthermore, the individual storage cells no longer contain excessive magnetic material.

The switching time is favorably influenced and the switching current remains low.

The evaporation-deposition of magnetic substances on surfaces is known per se and no longer presents practical difficulties. Spraying molten metals or ceramic substances onto a substrate is also known per se and has previously been technically introduced for certain uses. For example, copper layers are sprayed onto ceramic surfaces and zinc layers onto the surfaces of paper capacitors. If carried out in a suitable manner, this method yields surprisingly compact homogeneous layers. At the same time, the substrates being sprayed are heated only comparatively slightly. As compared with a plate molded from powdered ferrite, a sprayed ferrite paste has a density such that any appreciable internal demagnetization through pores does not occur. The required magnetic storage and switching behavior is therefore obtained. In addition to ferrite, magnetic materials suitable for use are nickel-iron alloys having a rectangular hysteresis loop that is obtained, for example, by cooling of the magnetic field. Alternatively, the memory material may be formed by magnetizable layers which are deposited by evaporation in vacuo.

In order that the invention may be readily carried into effect, it will now be described in detail, by way of example, with reference to the accompanying diagrammatic drawings, in which.

Figure 1:
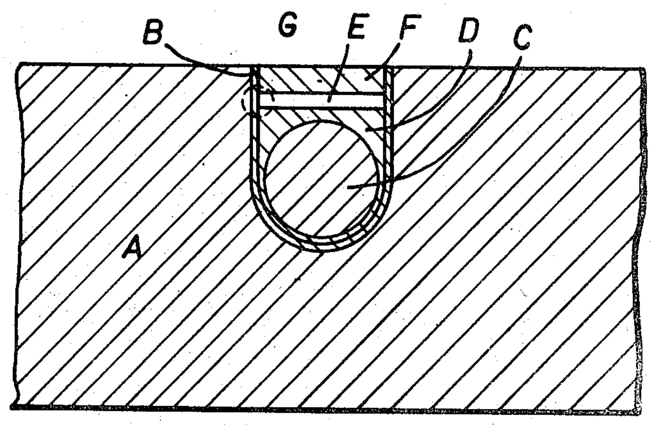
FIGS. 1 and 2 illustrate a first embodiment of the invention.
Figure 2:
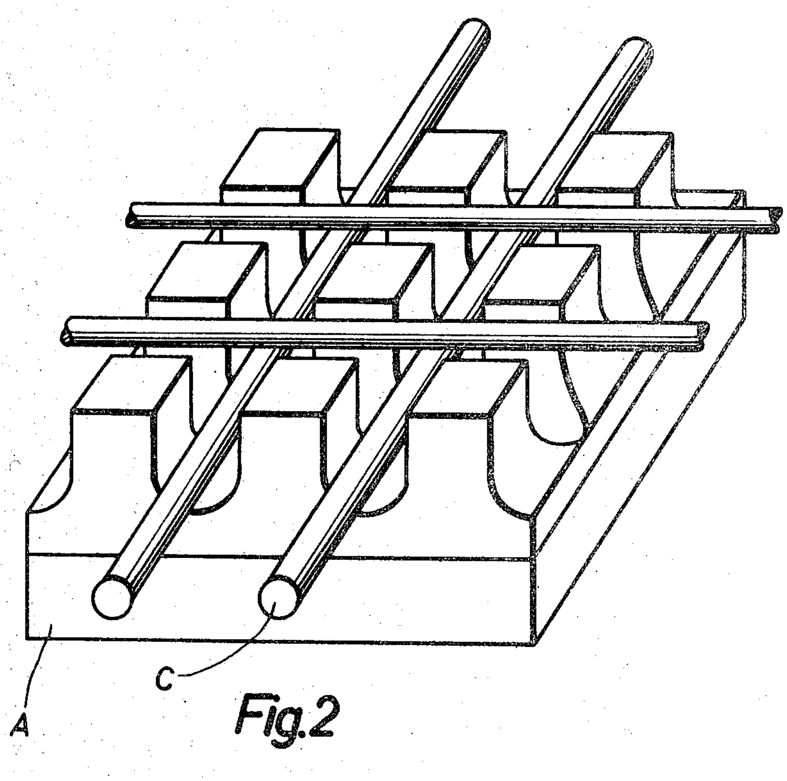

In FIGS. 1 and 2, a plate A, preferably of synthetic material or any other suitable material, has a grating of grooves formed in it by milling, or pressed in it during the production of the plate A. A magnetic layer B, preferably a ferrite layer, is applied to the grooves in the molten state by spraying, or by evaporation-deposition from the gaseous phase, in such a manner that the faces of the grooves are covered throughout with the solidified magnetic layer B. Next a prefabricated gauze C of matrix wires is placed in the grooves. The interspaces are then filled with a suitable filler D so as to obtain a flat surface in the grooves to which another ferrite layer E is applied in the molten state by spraying, or by evaporation from the gaseous phase, until this surface is covered with a magnetic layer up to the edges of the grooves. The remaining part of the grooves may be filled with synthetic material F. The filler D may be, for example, a temperature-resistant lacquer, for example, silicione lacquer.

The arrangement may be designed so that either the layer B or the layer E, or both layers B and E, consist of a material having a rectangular hysteresis loop. In one case, magnetic storage takes place only in the layer B. The layer E then reduces the magnetic reluctance for the magnetic flux. If storage takes place in the layer E, then the layer B must have a negligible magnetic reluctance. If both layers B and E have rectangular hysteresis loops, the properties are similar to those of an annular core. In all cases it is important that the layers B and E satisfactorily fuse together at poin G, or that any air gap occurring thereat be relatively small.

The current conductor C of a matrix wire gauze, as shown in FIG. 1, need not be a single conductor, but may be a bundle of conductors. The number of conductors is then a function of the bind of the wiring and primarily of the form of organization of the storage device.

Figure 3:
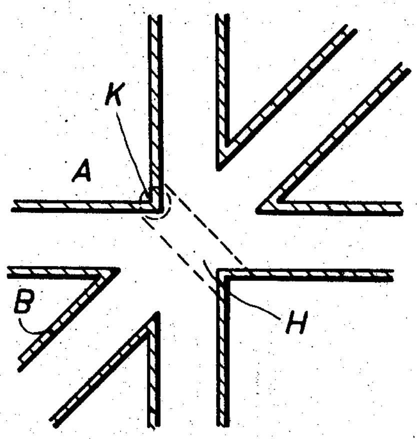
FIGS. 3–6 show other embodiments of the invention.
Figure 4:
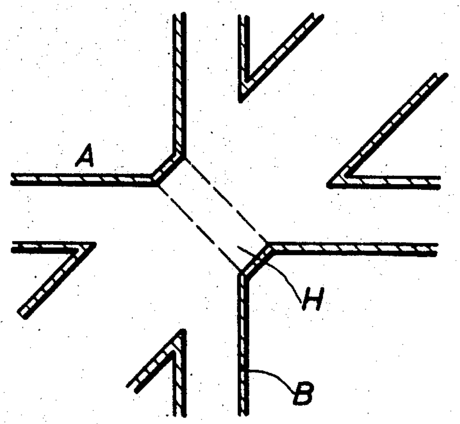
Figures 5, 6:
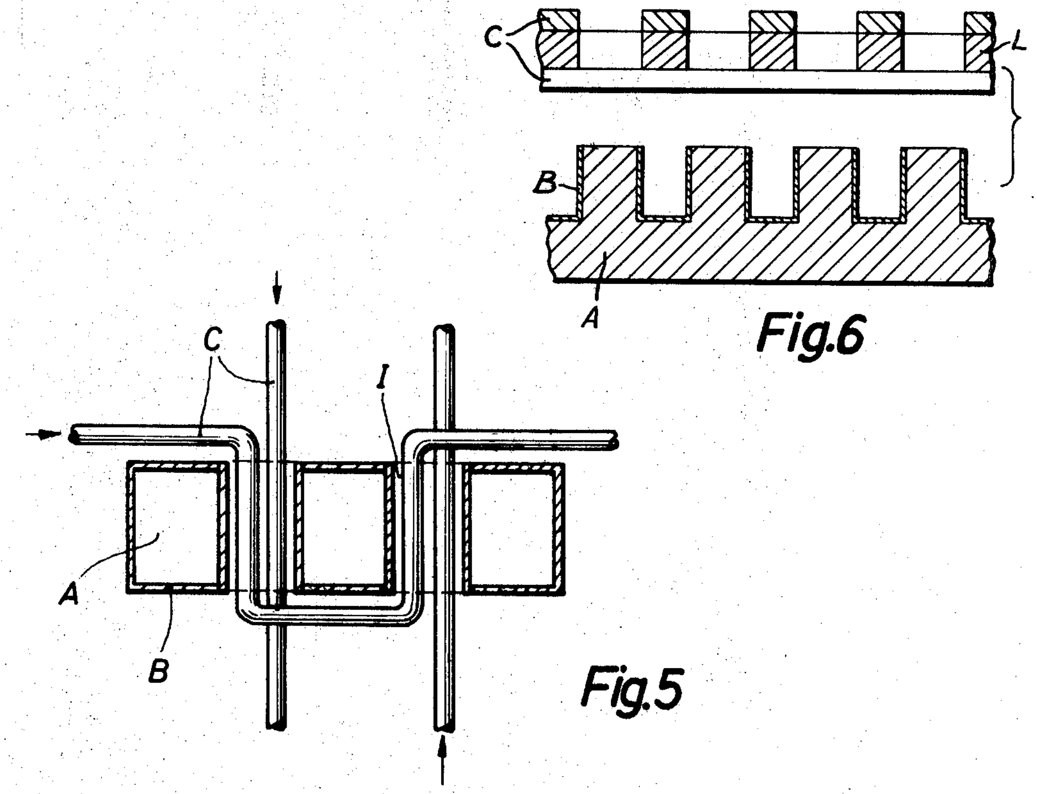

FIG. 2 is a perspective view of a grating plate with several conductors intersecting perpendicularly. The grooves thus extend in X and Y directions. The information may be stored in the node points H of the wiring (FIGS. 3 and 4) and on parallel pieces F (FIG. 5). FIGS. 3 and 4 show a node point of a wiring typical of a current coincidence store and having an additional diagonal groove. In FIG. 4, the groove in the diagonal direction is wider than the grooves in the X or Y direction, thus avoiding any irregularities upon applying the magnetic layer B at the corners K (FIG. 3). Storage cells with parallel guiding of the conductors are shown in FIG. 5. The positions of the storage elements proper are shown in broken lines in FIGS. 3, 4 and 5.

The wiring may also be formed photochemically on thin foil nettings L which are laid in the grating of the plate A (FIG. 6). It is thus possible to utilize both foil faces for the guide C of conductors and to stack a plurality of relatively electrically insulated conductive plates on top of one another. In this method a filling mass D is not needed at all.

It is furthermore possible to store the information in very thin layers applied so that the re-magnetization is affected parallel to the surface of the layer substantially by coherent rotational processes. When these layers, for example, nickel-iron alloys, are manufactured by cooling of the magnetic field or by tempering (moderate heating to several hundreds of ° C.), they may be given a preferred magnetic direction with a substantially rectangular hysteresis loop.

What is claimed is:

1. A method of manufacturing a magnetic memory matrix comprising the steps of depositing a continuous layer of magnetic material directly on the surfaces of a matrix of intersecting grooves provided in a base plate of synthetic material, positioning a matrix of electrical conductors in said grooves, covering said conductors with a layer of filler material, coating the surface of the filler material with a layer of magnetic material which contacts the layer of magnetic material on the wall surface of the grooves and forms therewith a substantially closed magnetic loop, and covering the latter layer of magnetic material with a synthetic material that fills the grooves up to the top surface of the base plate.

2. A method of fabricating a magnetic storage matrix comprising the steps of forming a plate of synthetic material having a matrix of grooves in at least one surface, coating the surfaces of said grooves with a continuous layer of magnetic material by depositing in said grooves discrete particles of magnetic material in the liquid or gaseous state, placing a matrix of electrical conductors in said grooves, filling the spaces in said grooves with a heat-resistant filler material so as to produce a flat surface in said grooves covering said conductors, and coating said flat surface with a layer of magnetic material up to the walls of the grooves by depositing thereon discrete particles of magnetic material in the liquid or gaseous state until the magnetic surface layer fuses with the magnetic wall layer thereby forming a plurality of substantially closed magnetic paths within the grooves.

3. A method of fabricating a magnetic storage matrix comprising the steps of forming a plate of synthetic material having a matrix of grooves in at least one surface, depositing a continuous layer of ferrite material on the surfaces of said grooves by spraying a molten ferrite material in said grooves and allowing said deposited material to cool, placing a preformed matrix of electrical conductors in said grooves, filling the spaces in said grooves with a filler material so as to cover said conductors, and spraying a molten ferrite material over said filler material to deposit a continuous layer of ferrite material thereon that extends up to, and in contact with, the ferrite layer on the walls of the grooves and forms therewith a substantially closed magnetic loop.

4. A method of fabricating a magnetic storage matrix comprising the steps of forming a plate of synthetic material having a matrix of grooves in at least one surface, depositing a magnetic material by evaporation onto the surfaces of said grooves so as to cover the entire surfaces thereof with a layer of magnetic material, placing a preformed matrix of electrical conductors in said grooves, filling the spaces in said grooves with a filler material so as to cover said conductors, and depositing a magnetic material by evaporation over said filler material to coat the exposed surface thereof with a layer of magnetic material that extends up to, and in contact with, the magnetic wall layer of said grooves and forms therewith a substantially closed magnetic loop.

5. A method of manufacturing a magnetic storage device comprising the steps of, forming a grooved grating in a body of synthetic material, forming a ferrite layer in the grooves by spraying a molten ferrite material or by vapor-depositing a ferrite material in the grooves so that the surfaces of the grooves are entirely covered by a solidified magnetic layer, placing a prefabricated gauze of matrix conductors in the grooves, filling the interspaces with a suitable filler material so as to obtain a flat surface in the grooves, and forming a ferrite layer on said flat surface by spraying a ferrite material in the molten state or by vapor-depositing a ferrite material on said surface until the surface is covered with a magnetic layer up to the walls of the grooves and forms therewith a substantially closed magnetic loop.

6. A method as claimed in claim 5 further comprising the step of filling the remaining space of the grooves with a synthetic material.

7. A method as claimed in claim 5 wherein the ferrite wall layers and the ferrite covering layers of the grooves are composed of a material having a rectangular loop hysteresis property.

8. A method as claimed in claim 5 wherein either the wall layers or the covering layers are composed of a material having a rectangular hysteresis loop and the other layer is composed of a material having a low magnetic reluctance.

9. A method as claimed in claim 5 wherein the magnetic layers are applied as thin films of a thickness such that magnetic reversal takes place parallel to the surface of the layer substantially by coherent rotational processes and these magnetic layers when manufactured by cooling or tempering of the magnetic field exhibit a magnetic preferred direction with a substantially rectangular hysteresis loop.

10. A method of fabricating a magnetic storage matrix, comprising the steps of forming a crossed matrix of intersecting grooves in a base plate composed of a synthetic material, adhering a continuous layer of ferrite material directly on the surfaces of said grooves by heating said ferrite material to a non-solid state and depositing the non-solid ferrite material in said grooves, placing a matrix of electrical conductors in said grooves, filling the spaces in said grooves with a synthetic filler material so as to cover said conductors, and depositing a layer of ferrite material over said filler material so as to coat the exposed surface thereof and to fuse with the ferrite layer on the wall surface of the grooves to form therewith a substantially closed magnetic loop.

References Cited

UNITED STATES PATENTS

| | | | |
|---|---|---|---|
| 3,100,295 | 8/1963 | Schweizerhof | 29—604X |
| 3,267,443 | 8/1966 | Brownlow | 340—174 |
| 3,448,514 | 6/1969 | Reid et al. | 29—604 |
| 3,460,113 | 8/1969 | Hisao Maeda | 340—174 |

OTHER REFERENCES

IBM Technical Disclosure Bulletin, vol. 6, No. 1, June 1963, p. 107.

JOHN F. CAMPBELL, Primary Examiner

D. C. REILEY, Assistant Examiner

U.S. Cl. X.R.

340—174